5 Sheets--Sheet 2.

J. D. ROBINSON.
Machines for Making Eyelets.

No. 155,110. Patented Sept. 15, 1874.

5 Sheets--Sheet 3.

J. D. ROBINSON.
Machines for Making Eyelets.

No. 155,110. Patented Sept. 15, 1874.

5 Sheets--Sheet 5.
J. D. ROBINSON.
Machines for Making Eyelets.
No. 155,110. Patented Sept. 15, 1874.
Fig. 5
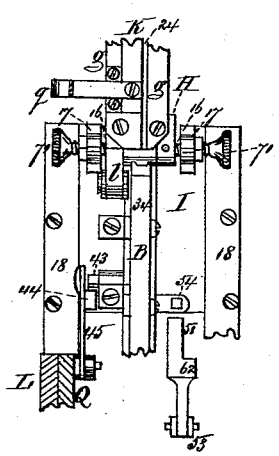
Fig. 10
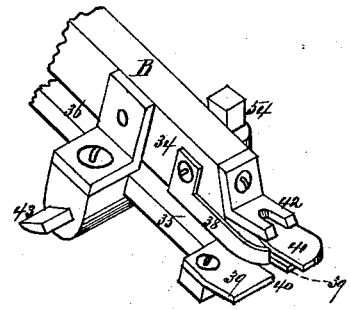
Fig. 11
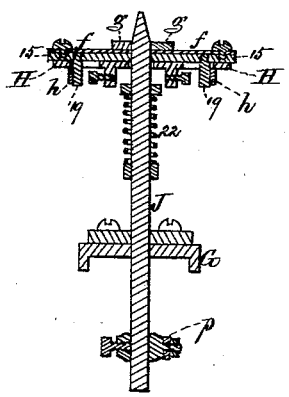
Fig. 12    Fig. 13
Witnesses,
W. J. Cambridge
Wm. P. Clark
Inventor,
John D. Robinson,
Per Teschemacher & Stearns,
Attorneys.

UNITED STATES PATENT OFFICE.

JOHN D. ROBINSON, OF TAUNTON, MASSACHUSETTS, ASSIGNOR TO THE ALBERT FIELD TACK COMPANY, OF SAME PLACE.

IMPROVEMENT IN MACHINES FOR MAKING EYELETS.

Specification forming part of Letters Patent No. 155,110, dated September 15, 1874; application filed July 31, 1874.

*To all whom it may concern:*

Be it known that I, JOHN D. ROBINSON, of Taunton, in the county of Bristol and State of Massachusetts, have invented certain Improvements in Eyelet-Machines, of which the following is a full, clear, and exact description, reference being had to the accompanying drawings, making part of this specification, in which—

Figure 1:
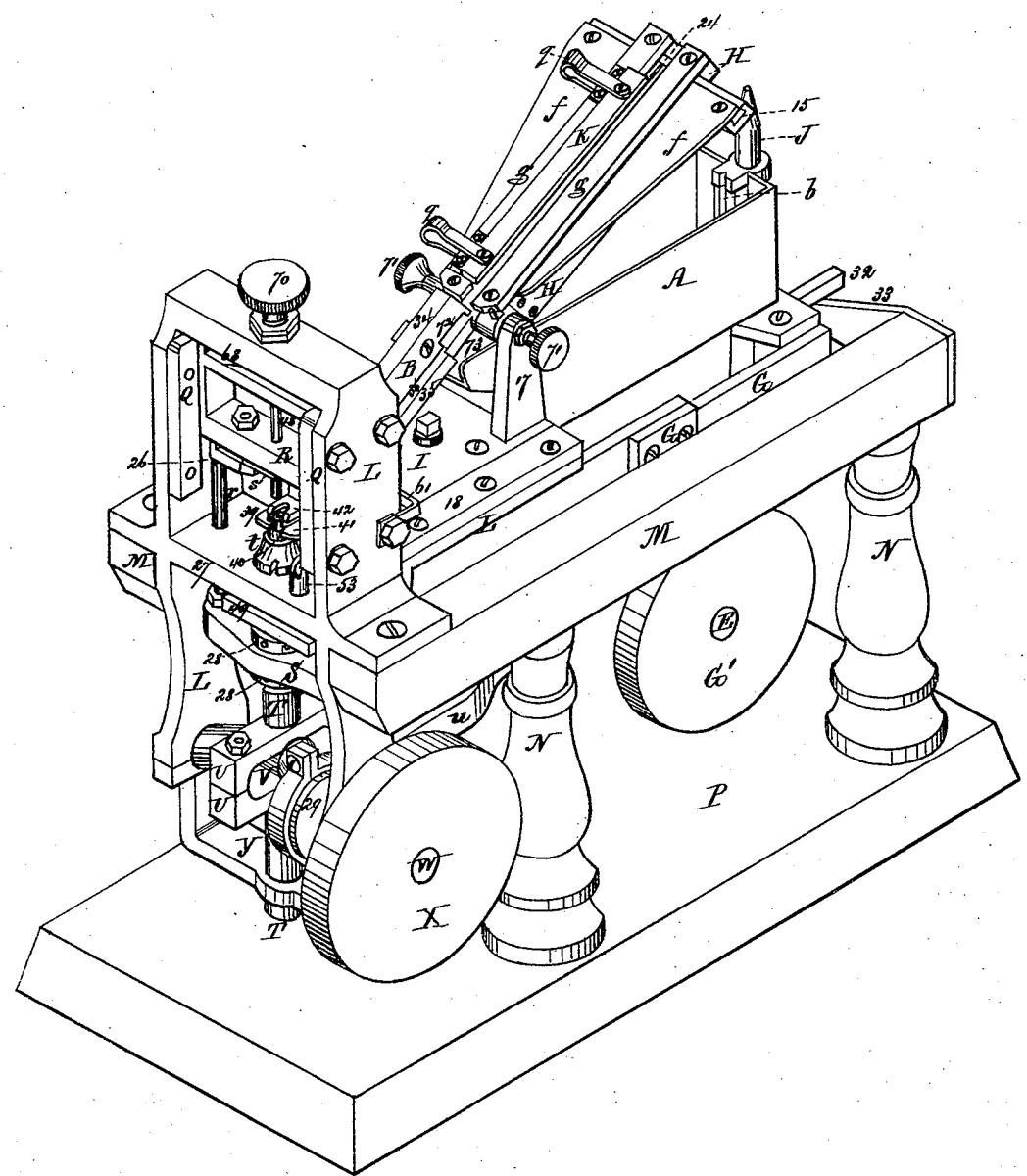
Figure 2:
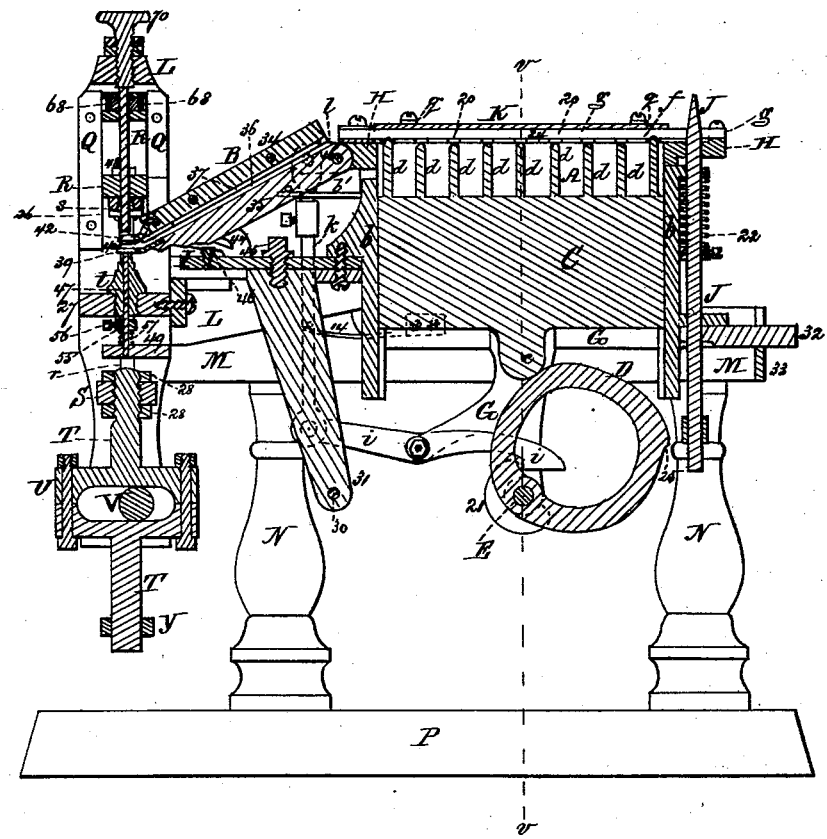
Figure 3:
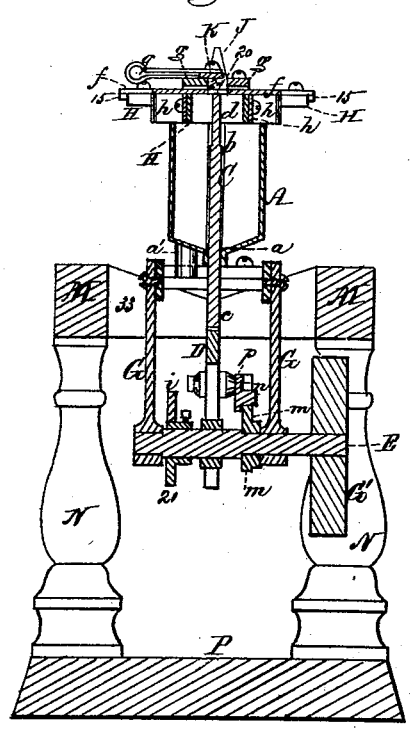
Figure 4:
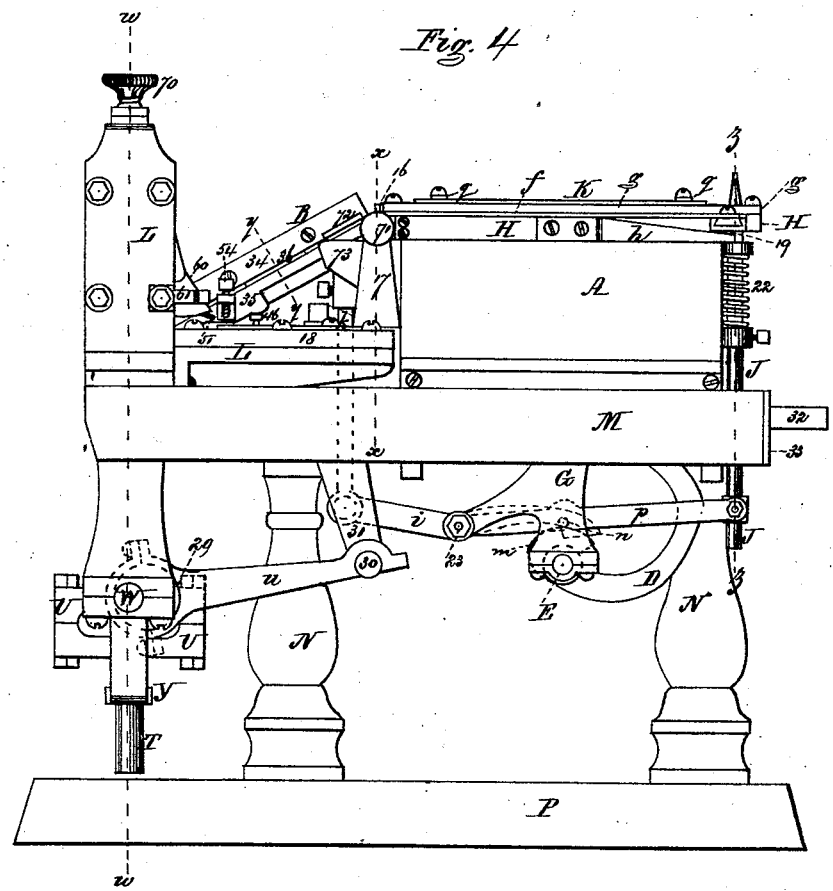

Figure 1 is a perspective view of my improved eyelet-machine. Fig. 2 is a longitudinal vertical section through the center of the same. Fig. 3 is a transverse section on the line *v v* of Fig. 2. Fig. 4 is a side elevation, the driving-pulleys being removed. Fig. 5 is a plan of a portion of the machine. Fig. 6 is a transverse vertical section on the line *w w* of Fig. 4. Fig. 7 is a transverse section on the line *x x* of Fig. 4; Fig. 8, section on the line *y y* of Fig. 4; Fig. 9, sectional detail; Fig. 10, detail in perspective (enlarged;) Fig. 11, section on the line *z z* of Fig. 4; Fig. 12, perspective view of a cup or unfinished eyelet in the form in which it is placed in the hopper; Fig. 13, perspective of the partially-finished eyelet after it leaves the machine.

In machines for making eyelets, as heretofore constructed, where a revolving brush is employed for sweeping the cups or unfinished eyelets from the hopper into the chute, by which they are delivered to the forming-tool, the opening leading from the hopper to the chute is liable to become clogged by imperfectly-formed cups or by dirt, necessitating the removal of the obstruction, which results in a considerable loss of time, and in the event of cups made of different machines, and whose lengths vary somewhat, being placed at different times in the hopper, it is necessary to adjust the depth of the opening leading from the hopper to the chute, which is an extremely difficult operation, and, notwithstanding the care required in its adjustment, this opening is also frequently clogged from this cause. Furthermore, the wire of which the brush is formed is frequently broken, and a new brush has to be substituted therefor, which is consequently expensive. The proper delivery of the cups also depends on the peculiar shape of the opening, which soon becomes worn, and the entire plate in which it is made must be discarded, and a new one provided therefor.

To obviate the above-mentioned difficulties is the purpose of my invention, which consists in a hopper, provided with a slit or opening for the passage of a sliding plate, provided with a series of pins, which pick up the cups and carry them up above a pair of jaws previously separated, the unfinished eyelets being held in this position until the jaws are brought together underneath them, when the pins are withdrawn, leaving the cups in a guide or way, the bottom of which is formed by the jaws when closed together, and the sides by two stationary pieces secured over the jaws.

The jaws and guide, formed as described, are tilted into an inclined position immediately after the withdrawal of the pins, a spring-plate being secured over the opening at the top of the guide, which yields sufficiently to allow the cups to be carried to such a distance above the jaws as to prevent the latter from coming into contact therewith when they close together, the spring-plate returning to its normal position when the pins are withdrawn, and serving to prevent the cups from tilting, and keeping them in their proper position as they slide down to the chute. My invention also consists in a means for relieving the chute from any surplus cups which may be delivered faster than they are finished. My invention furthermore consists in a combination embracing a stationary forming-tool, provided with a clearing-rod for loosening and lifting the uncompleted eyelet therefrom, in combination with a movable die made to rise and fall thereover; and my invention also consists in sundry details to be enumerated hereafter.

To enable others skilled in the art to understand and use my invention, I will proceed to describe the manner in which I have carried it out.

In the said drawings, A represents the hopper, into which are placed the cup-shaped blanks or unfinished eyelets, (previously made in another machine,) to be fed successively down to an inclined chute, B, by which they are delivered to a mechanism for operating on them, to be hereafter described. Longitudinally through the center of the bottom of the hopper extends a slit or opening, $a$, in which is a vertically-sliding plate, C, the ends of which fit in guides $b$. The lower side of this plate is provided with a projection, $c$, which rests on a cam, D, on the driving-shaft E, having its bearings in the frame G, which supports the hopper; and, as this shaft is revolved by a belt (not shown) passing over a drum, G', the plate C is moved up and down for a purpose now to be explained. The upper side of this sliding plate is provided with a series of vertical pins, $d$, the tops of which are smoothly rounded off, the office of each pin being to pick up a cup or unfinished eyelet, $e$, Fig. 12, as the sliding plate ascends through the opening $a$ in the hopper, and deliver it above the surface of two jaws, $f f$, which are attached to dovetailed blocks 15, which slide in correspondingly-shaped grooves in the head of a T-shaped frame, H, pivoted at 16 to standards 17 rising from opposite sides of a dovetailed block, I, which moves in dovetailed guides 18. The jaws $f f$ slide beneath longitudinal guides $g g$ secured to the frame H, and, by being rigidly secured to the sliding blocks 15, are kept parallel at all times to each other, springs $h$ attached to the frame H, and bearing on pins 19 projecting down from the blocks 15, being employed for keeping the inner edges of the jaws $f f$ in contact with each other; and each of these jaws is provided with a series of semi-circular notches, 20, which, when the inner edges of the jaws are brought together, form circular openings, through which the pins $d$ project when brought up by the cam D. The frame H descends by its gravity, assisted by a spring, 14, to meet the ascending pins $d$, and is afterward raised into an inclined position by a cam, 21, on the shaft E, which operates a lever, $i$, to which is pivoted the lower end of a rod, $k$, the upper end of which is attached to an arm, $l$, extending from the frame H. As the frame H with its jaws $f f$ descends the latter are separated by the conical or wedge-shaped point of a vertical rod, J, over which they fall, this rod moving in guides, and having been previously elevated against the resistance of a spiral spring, 22, by a cam, $m$, acting on the under side of a pin, $n$, projecting from one side of a lever, P, pivoted at 23 to the frame G, and having its outer end secured to the lower end of the vertical rod J. As the sliding plate C rises the pins $d$ pick up the cups, and the jaws $f f$ at the same time descend until they are separated by the conical point of the vertical rod J, as before described. The pins $d$ then continue to rise till the cups are brought up above the level of the top of the jaws, when the rod J is withdrawn from between them by its spring 22, when they are instantly closed by the springs $h$, a plate, K, attached to springs $q$ being secured over the opening between the longitudinal guides $g g$, which form the sides of a way or channel, 24, in which the cups are deposited, the bottom of this channel being formed by the edges of the jaws when closed together. As the pins $d$ rise the two end ones, which are a little longer than the others, and project slightly above them, come in contact with the under side of the spring-plate K, which yields sufficiently to allow the cups to be carried to such a distance above the jaws as to prevent the latter from coming into contact therewith when they close together. The pins $d$ are now withdrawn from between the jaws by the descent of the plate C, which takes place as soon as the portion 25 of the cam D has passed from under the projection $c$, leaving the cups in the way or channel 24, when the frame H with its jaws $f f$ is raised into the inclined position seen in Fig. 1 by the mechanism previously described, so as to allow the cups to slide down the channel into the chute B, the plate K being held down by its springs in such a position as to keep them from turning over, and yet not touch and prevent them from freely sliding down to the chute. When the frame and jaws are in this position the lower end of the channel 24 is brought up close to the upper end of the chute, to prevent the escape of any cups at this point.

By making the end pins $d$ longer than the others, the plate K is prevented from exerting a pressure on the cups picked up by the shorter pins, which insures the cups being deposited squarely upon the bottom of the channel 24 by the pins as they are withdrawn. The pins $d$ will only take up the cups when they are properly formed, and the imperfect ones are thus prevented from being fed into the chute.

$a'$, Fig. 3, is a spout, through which the hopper may be emptied of its cups, this spout being closed by a plug. The dovetailed guides 18 of the block I are secured upon the framework L, which is secured to longitudinal bars M, supported by posts N rising from the bed P. Within adjustable guides Q in the upright portion of the frame L slides a frame, R, which is connected, by vertical rods $r$, with the cross-head S, secured to the top of a rod, T, provided near its center with a slotted block, U, within which turns the crank V on a shaft, W, having its bearings in the lower part of the frame-work L, the outer end of the shaft W being provided with a drum, X, over which passes a belt, (not shown,) by which the mechanism is operated, the shafts W and E being revolved independently of each other. The lower end of the rod T passes through a guide, Y, which steadies it in its vertical movement. To the under side of the lower cross-bar of the frame R is secured, by a clamp, 26, the die $s$, which is situated in line immediately above the forming-tool $t$, which is secured immovably upon the transverse portion 27 of the frame L. The frame R is adjusted to vary its distance from the cross-head by means of nuts 28 on the rod T, so as to regulate the degree of pressure of the die $s$ upon the cup on the forming-tool $t$. The upper end of the inclined chute B, at its junction with the channel 24, is pivoted to the frame H, which, together with the hopper A, frame G, and block I, are reciprocated by a connecting-rod, $u$, one end of which is attached to an eccentric, 29, on the shaft W, the other end being hooked over a stud, 30, on the lower end of an arm, 31, projecting from the under side of the block I, as seen in Fig. 4. One end of the hopper-frame G is supported by the block I, and its opposite end by a V-shaped bar, 32, resting in a groove in a plate, 33, secured to the ends of the bars M. The chute B is composed of two portions, 34 35, separated a short distance from each other, leaving a space or opening, 36, on each side to allow of the escape of dirt, which might otherwise interfere with the passage of the cups. The upper portion, 34, of the chute is provided with a groove, 37, of a suitable form to allow of the passage of the cups to a spring-stop, 38, at its lower end. To the lower end of the portion 35 is secured a curved plate, 39, having an open slot, 40, at its center, this plate serving as a support for the cup, which rests upon the edges of the slot, and is held in position on one side by the spring-stop 38, and on the other by a plate, 41, secured to the curved plate 39, the upper portion, 34, of the chute being provided with a bifurcated projection, 42, to be hereafter described.

The cups, as they slide down the chute B, are successively arrested by the spring-stop 38 at its lower end, and are transferred to the forming-tool $t$ in the following manner: On one side of the lower portion, 35, of the chute is a projection, 43, which, as the chute is advanced, rides up over the inclined surface of a projection, 44, extending out from the side of a lever, 45, pivoted to an arm secured to one of the guides Q of the frame L, by which means the lower end of the chute is raised, and the cup held in place thereon is elevated sufficiently to raise its lower edge above the level of the top of the forming-tool $t$. The chute continues to advance in this plane until the projection 43 passes off the projection 44, when the lower end of the chute drops by its own weight, assisted by a spring, $b'$, and deposits the cup on the forming-tool $t$, the bifurcated projection 42 serving as a guard to prevent the displacement of the cup while being placed on the forming-tool. The fall of the chute is arrested by coming in contact with a screw, 46, made adjustable to regulate the extent of its descent. On the withdrawal of the chute, which takes its lower end out of the path of the die $s$, the projection 43 passes underneath the projection 44, lifting it and the lever 45, until the projection 43 passes out from under the projection 44, when the former, 43, is left in the proper position to again ride up over the latter, 44, on the advancement of the chute, as before described. 47 is a vertical rod, which passes centrally through the forming-tool $t$, and serves as a clearer to loosen and lift the uncompleted eyelet from the forming-tool, and insure its retention within the die $s$, until removed by a clearer, 48, passing vertically through it, the operation of which will be presently described. The lower end of the clearer, 47, passes through and is guided by a cross-bar, 49, which also serves as a guide for the lower end of a vertical rod, 50, which passes up through the transverse portion 27 of the frame L, and on the top of this rod 50 rests a lever, 51, one end of which is pivoted to a short stud, 53, the other end extending out into a position to be struck by a set-screw, 54, connected with the chute, when it descends, as previously described. The clearer 47 and the rod 50 are connected by a horizontal bar, 55, secured thereto by set-screws 56 in order that they may move together, the lower end of the clearer 47 being surrounded by a spiral spring, 57, and the upper end of the rod 50 by a spiral spring, 58. As the lower end of the chute descends to deposit the cup on the forming-tool, the set-screw 54 depresses the lever 51, together with the rod 50 and clearer 47, connected therewith, against the resistance of the springs 57 58, and the top of the clearer is thus brought down to a level with the top of the forming-tool to enable the cup to be properly seated thereon, the descent of the clearer being limited by the connecting-bar 55 being brought down on the head of a set-screw, 59. After the lever 51 has been brought down, as above described, a pivoted latch, 60, is thrown by a spring, 61, over the portion 62 of the lever 51, holding it in this position, and keeping the clearer 47 down on a level with the top of the forming-tool while the eyelet is being formed in the die. Just previous to the completion of this operation the lower end of a set-screw, 65, attached to the frame R strikes a projection, 66, on the side of the latch 60, and throws it out of contact with the lever 51 against the resistance of its spring 61, when the lever 51 is thrown up by the spring 58, leaving a space between the lever and the top of the rod 50, the upward motion of the lever being limited by a pin, 67, projecting from the latch 60. This release of the lever 51 allows the spring 57 to exert a strong upward pressure on the clearer 47, to enable it to loosen and lift the uncompleted eyelet from the forming-tool, and insure its positive retention within the die until removed therefrom by the clearer 48, which passes vertically through it and the top and bottom of the frame R, sufficient friction being exerted on the clearer by a bent spring, 68, to cause it to be lifted by the frame R, this friction being overcome when the top of the clearer 48 comes into contact with the bottom of a screw or stop, 70, and as the frame continues to rise the die moves up on the lower end of the clearer now at rest, which thus forces the uncompleted eyelet out of the die, as required, the head or stop of the eyelet being afterward punched out by another machine, to which it is subsequently taken to be finished.

This clearer 48, as the frame R descends, strikes the top of the cup which has just been deposited on the forming-tool and seats and holds it centrally thereon while the lower end of the chute is being withdrawn, the clearer 48 being forced up within the die and frame as the latter descends. The frame H, to which the upper end of the chute is pivoted, is made adjustable laterally by means of thumb-screws 71, in order to bring the lower end of the chute exactly in the right position for depositing the cup on the forming-tool.

By moving the die over a stationary forming-tool provided with a movable clearer, the sticking of the eyelet on the forming-tool is entirely avoided and its retention in the die insured; whereas, where the forming-tool is forced into a stationary die, as heretofore, and a spring is employed to return it, in case a double eyelet were pressed into the die, the spring would not possess sufficient power to withdraw the forming-tool therefrom. Near the upper end of one side of the portion 34 of the chute B is formed a rectangular opening, 72, of sufficient size to allow of the lateral passage and escape of any surplus cups therefrom in the event of their being delivered into the chute faster than they are finished.

On one side of the chute, immediately below the opening 72, is placed a conductor, 73, by which the surplus cups are returned to the hopper A.

I am aware that a movable holder or former and fixed die have heretofore been used, as shown in the patent to E. B. Butler, dated August 7, 1866, and therefore I do not claim these elements in combination; but

What I claim as my invention, and desire to secure by Letters Patent, is—

1. The hopper A, in combination with the series of reciprocating pins $d\ d$, for raising the cups or unfinished eyelets and delivering them to suitable mechanism, by which they are fed forward to be formed, substantially as described.

2. The sliding jaws $f\ f$ and guides $g\ g$, attached to the movable frame H, in combination with the hopper A and reciprocating pins $d$, operating substantially in the manner and for the purpose described.

3. The yielding plate K, in combination with the guides $g\ g$, jaws $f\ f$, and pins $d$, substantially as and for the purpose set forth.

4. The vertical-sliding pointed rod J and spring 22, in combination with the jaws $f\ f$, springs $h\ h$, plate $k$, and springs $q\ q$, all combined, arranged, and operated as set forth.

5. The hopper A, jaws $f\ f$, and chute B, secured to a reciprocating frame, so as to move simultaneously together, when combined to operate substantially as and for the purpose described.

6. The chute B, with its longitudinal openings 36, to allow of the escape of dirt, substantially as set forth.

7. The chute B, with its opening 72, to allow of the escape of surplus cups, substantially as described.

8. The chute B, with its opening 72, in combination with the conductor 73 leading into the hopper A, substantially as and for the purpose set forth.

9. The chute B, with its plates 39 41, spring-stop 38, and bifurcated projection 42, in combination with a mechanism for giving the required movement to the chute to cause it to deposit the cup upon the forming-tool $t$, substantially as specified.

10. The clearer 47, connected with the rod 50, springs 57 58, and lever 51, in combination with the set-screw 54 on the chute B, and the latch 60, operating substantially as and for the purpose set forth.

11. The combination, as herein described and shown, of the clearer 48, movable die $s$, sliding frame R, frictional devices 68, and the stop 70, substantially as and for the purpose set forth.

Witness my hand this 22d day of July, A. D. 1874.

JOHN D. ROBINSON.

In presence of—
P. E. TESCHEMACHER,
W. J. CAMBRIDGE.